(12) United States Patent
Slemmer

(10) Patent No.: US 6,226,677 B1
(45) Date of Patent: May 1, 2001

(54) CONTROLLED COMMUNICATIONS OVER A GLOBAL COMPUTER NETWORK

(75) Inventor: Michael W. Slemmer, Sioux Falls, SD (US)

(73) Assignee: LodgeNet Entertainment Corporation, Sioux Falls, SD (US)

( * ) Notice: Subject to any disclaimer, the term of this patent is extended or adjusted under 35 U.S.C. 154(b) by 0 days.

(21) Appl. No.: 09/232,386

(22) Filed: Jan. 15, 1999

Related U.S. Application Data

(60) Provisional application No. 60/109,878, filed on Nov. 25, 1998.

(51) Int. Cl.[7] ............................................. G06F 13/00
(52) U.S. Cl. ................................................... 709/227
(58) Field of Search .............................. 705/14; 709/202, 709/317, 227

(56) References Cited

U.S. PATENT DOCUMENTS

| | | | |
|---|---|---|---|
| 5,781,550 | * 7/1998 | Templin et al. ............... | 370/401 |
| 5,802,320 | 9/1998 | Baehr et al. .................. | 709/249 |
| 5,948,061 | * 9/1999 | Merriman et al. ............. | 709/219 |
| 6,014,698 | * 1/2000 | Griffiths ....................... | 709/224 |
| 6,098,172 | * 8/2000 | Coss et al. .................... | 713/201 |
| 6,119,162 | * 9/2000 | Li et al. ........................ | 709/227 |

* cited by examiner

Primary Examiner—Kenneth R. Coulter
(74) Attorney, Agent, or Firm—Sheridan Ross P.C.

(57) ABSTRACT

In one embodiment, a method related to controlling communication of a TCP packet from a user machine is disclosed. During a browser request from the user machine, the TCP packet is sent via the intranet to a forced proxy server. The TCP packet having a number of fields including a first field related to a first destination IP address. The TCP packet and its first destination IP address is received by the forced proxy server and analyzed. If the first destination IP address is not from a "sandboxed" domain, the first destination IP address is changed to a predetermined second destination IP address to effectively reroute the TCP packet to another IP address on the Internet. The rerouted IP address provides content to the user machine in which at least a majority of the content is different from that expected to be obtained by the user machine.

27 Claims, 4 Drawing Sheets

CONTROLLED COMMUNICATIONS OVER A GLOBAL COMPUTER NETWORK

This application is related to and claims priority from Provisional Patent Application No. 60/109,878, filed Nov. 25, 1998.

FIELD OF THE INVENTION

The present invention relates to networks, and in particular, to an apparatus and method for controlling interaction with a global computer network.

BACKGROUND OF THE INVENTION

Systems of various configurations are known to control access to a global computer network, such as the Internet. Typically, systems block access to predetermined content on the Internet, forward a user from the selected address to a new address on the Internet or present advertising or other information to the user before accessing the Internet.

Software which prevents access to predetermined web sites based upon a selected criteria is well known. The software may reside on the user's computer or elsewhere to detect requests for content from prohibited or restricted IP (Internet Protocol) addresses. Periodic updates of the software is required to keep the list of such IP addresses current. Once a prohibited request is noted, the software does not return the requested content, but instead returns an appropriate message. In this way, content on the Internet is blocked.

Modern browsers have the capability for a web site to redirect the browser to a new web site. This feature is useful when the name or IP address of a web site has changed. The user may have saved the former universal resource locator (URL) or its corresponding IP address into the user's browser. When the user attempts to return to the former URL, the desired content may no longer be located there and has moved to a different URL on the Internet. To redirect the user to the desired web page, the former web site can command the browser to point to the new URL where the web page currently resides. In this way, the user is able to browse the desired content at the new URL with only a small delay.

Although redirection of a web browser is useful in directing the user to the desired content, it has not been used to direct the user to content that is not sought by the user. It would be counterintuitive to redirect the user to undesired content. Even if redirection were performed to attempt to have the user view unwanted content, the user could change the URL and cause the browser to view another location on the Internet.

Even though most browsers support the ability to redirect a user to a different web site, some browsers do not support this capability. Notably, older browsers and less popular browsers may not support this capability. Additionally, some browsers allow disabling the ability to redirect a user to another web site. In order to provide content from a different web site regardless of the browser's capability or configuration, there is a need for a browser independent redirection which cannot be disabled.

Proprietary ISPs (Internet Service Providers), such as America Online™, CompuServe™ and Prodigy™, require subscribers of the ISP to access their service with proprietary access software. This software typically has the capability of presenting the subscriber with advertising or other potentially unwanted information. Additionally this software has the capability of browsing the Internet. However, once the user has used the proprietary access software to access the Internet, the user cannot be redirected to potentially unwanted content from the Internet. The proprietary access software can only present potentially unwanted or non-requested content before access to the Internet. In other words, once Internet browsing has begun, the subscriber may browse the Internet freely.

Although browsing the Internet freely may be desirable to users, directing the user to content not specifically requested by the user may be valued by advertisers. This may also be of benefit to the user since income to the ISP derived from the advertisers might help defray the costs of providing Internet access to the user. Over time, users may view this diversion from anticipated content as advantageous in reducing their costs for using the Internet.

In summary, it appears desirable to develop a system which: (1) redirects the browser to potentially unwanted content regardless of the capabilities or configuration of the browser, and (2) requires the user to view or interact with the potentially unwanted content before the user can freely interact with any other content on the Internet.

SUMMARY OF THE INVENTION

In accordance with the present invention, a system which controls access to a global computer network is disclosed. In one embodiment, a method related to controlling communication of a TCP (Transmission Control Protocol) packet from a user machine is disclosed. During a browser request from the user machine, the TCP packet is sent via the intranet to a forced proxy server. The TCP packet has a number of fields including a first field related to a first destination IP address. The TCP packet and its first destination IP address are received by the forced proxy server and analyzed. If the first destination IP address is not from a "sandboxed" domain, the first destination IP address is changed to a predetermined second destination IP address to effectively reroute the TCP packet to another IP address on the Internet. The rerouted IP address provides content to the user machine in which at least a majority of the content is different from that expected to be obtained by the user machine. In one embodiment, all or substantially all of the content is different from that the first or requested destination IP address.

Relatedly, a system for controlling TCP packet transmissions relative to the Internet is disclosed. The system includes a user machine, a forced proxy server, and an intranet. Typically, the intranet is protected from intrusion by systems or individuals who access the Internet. The forced proxy server includes a first port for receiving TCP packets from the user machine or other machines attached to the intranet. The proxy server receives at least a first TCP packet from the user machine where the TCP packet includes a first destination IP address. IP addresses point to a location on the Internet which typically includes content. Upon receipt of the TCP packet, the forced proxy server ascertains whether the TCP packet is directed to the intranet or Internet. If the TCP packet is directed to the Internet, the TCP packet is passed to a forced proxying software program running on the proxy server. The software program may modify or leave unchanged the TCP packet based upon a predetermined criteria before the TCP packet is passed to the Internet. Based upon the predetermined criteria, the forced proxy server may return alternate content to the user machine from a source different from the first destination address. At least a majority of the alternate content is different from that expected to be obtained by the user machine.

Based upon the foregoing summary, a number of important advantages of the present invention are readily discerned. The browser can be controlled so that the user views potentially unwanted content regardless of the capabilities or configuration of the browser. Additionally, the user can be required to view or interact with the potentially unwanted content at times when the user may wish to freely interact with other content on the Internet. A system which achieves these goals is expected to help finance access to the Internet and thus reduce costs to users.

Additional advantages of the present invention will become readily apparent from the following discussion, particularly when taken together with the accompanying drawings.

DETAILED DESCRIPTION

A system and methods of operation are described in which predetermined controls are exercised over a user's ability to communicate and obtain information over a global computer network, such as the Internet. Generally, the system and methods of operation function to control information received by a user machine such that information is returned to the user machine which was not requested by it. More particularly, a user machine may request a particular web page or set of web pages using a browser, which pages are available on the world wide web accessible using the Internet. The present invention, depending on predetermined conditions, may cause information to be viewed on the user machine that was obtained from a different address or URL (Uniform Resource Locator) on the global computer network, such as a different web site. A web site, such as "www.abc.com", may be input into the browser on the user machine. However, instead of accessing this web site, the system would cause the user machine browser to actually display pages, HTML (HyperText Markup Language) text and/or images from a different source, such as a different address on the web.

The system also provides selective "sandboxing" in which certain web sites are directly accessible by the browser of the user machine while other web sites that are requested for access will result in triggering the controls implemented by the present invention (i.e., forced proxying), such as redirecting the request to another web site. In that regard, the user machine might receive as an input into its browser the name "www.xyz.com", which has a corresponding web address or URL, and browse that site with no interference. On the other hand, when the user machine receives an input related to another web site address or selection of a link that would take the user machine outside of the "www.xyz.com" site, the user machine would again be subject to the controls of the present invention (forced proxying).

Figure 1:
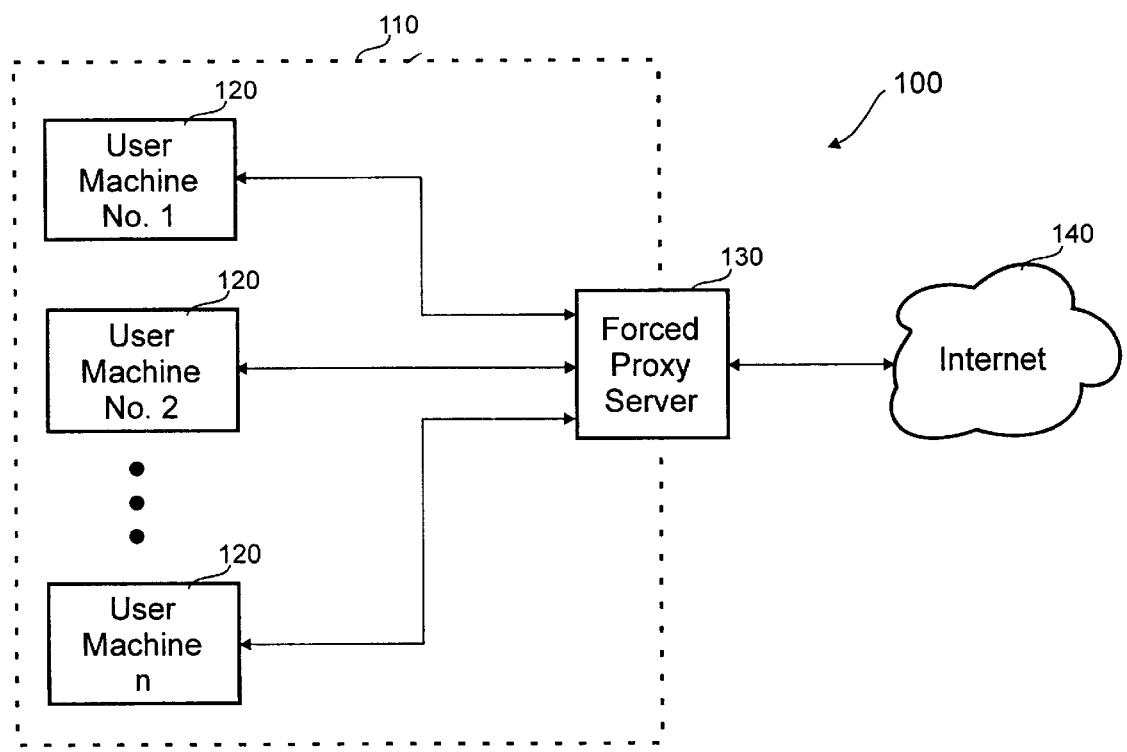
FIG. 1 is a block diagram which schematically depicts an embodiment of the control system.

With reference'to the FIG. 1, the system 100 includes one or more of a number of user or client machines 120. The system 100 is generally divided into an intranet 110 and the Internet 140. The intranet 110 is typically a private network isolated from the Internet 140 by a firewall. The firewall may be implemented on a forced proxy server 130. Each of the client machines 120 typically incudes at least one computer processor, a monitor having a display screen, storage memory, such as a hard drive and/or semi-conductor memory, and input devices, such as a keyboard and/or a mouse. The user machine 120 also has necessary or appropriate software including operating system software and a commercially available web browser. The system 100 also includes the forced proxy server 130 in communication with each of the one or more user machines 120. The server 130 can handle all signal traffic to/from each of the user machines 120. On the output side or port(s) of the server 130 is an interface or connector hardware that enables the server 130 to communicate with the Internet 140. In that regard, the server 130 essentially acts as a proxy for Internet communications with each of the user machines 120.

With regard to communications from the user machines 120 to the Internet 140, messages are sent to the Internet 140 from the user machines 120 by means of encapsulated parcels of data identified as "datagrams" or "packets." Each such packet must pass through the proxy server 130 to access the Internet 140. In controlling communications, the system 100, particularly the server 130, is interested only in TCP (Transmission Control Protocol) packets, which are used to carry essentially all web traffic. Each TCP packet contains the following fields or integers: source IP (Internet Protocol) address; source TCP port; destination IP address; and destination TCP port.

Requests to the world wide web from the user machines 120 are unique in that their destination TCP port is set to 80. When a packet is transmitted from a user machine 120, a transparent proxying software module in the server 130 makes a determination regarding whether or not the transmitted information relates to a web request. In that regard, the server 130 analyzes at least portions of each packet. If a packet TCP port is identified as 80, that packet is intercepted by the transparent proxying software module and redirected to a different TCP port on the server 130. A software control program running on the server 130 is in communication with that software port to which the packet is redirected. This software port responds to requests as if they were the web server on the Internet 140. This proxy server program or control program assumes control of the web request by fulfilling the actual request from the user machine 120 or implementing other predetermined steps. Such other predetermined steps relate to providing information to the user machine 120 from one or more particular web pages of a web site different from the user machine's 120 requested site. The identification of the web pages to be directed to the particular user machine can be based on a number of factors including: the input to the user machine 120 by the user or operator of that machine and provided to the browser on the user machine 120; the Internet or MAC address associated with the particular user machine 120; and other factors such as whether or not the Internet 140 is accessible to the particular user machine 120. The server 130 also has the capability of deactivating or essentially bypassing such controls in the sense of allowing a particular user machine 120 to freely access the Internet 140 as if the proxy server 130 were not interposed between the particular user machine 120 and the Internet 140.

Figure 2:
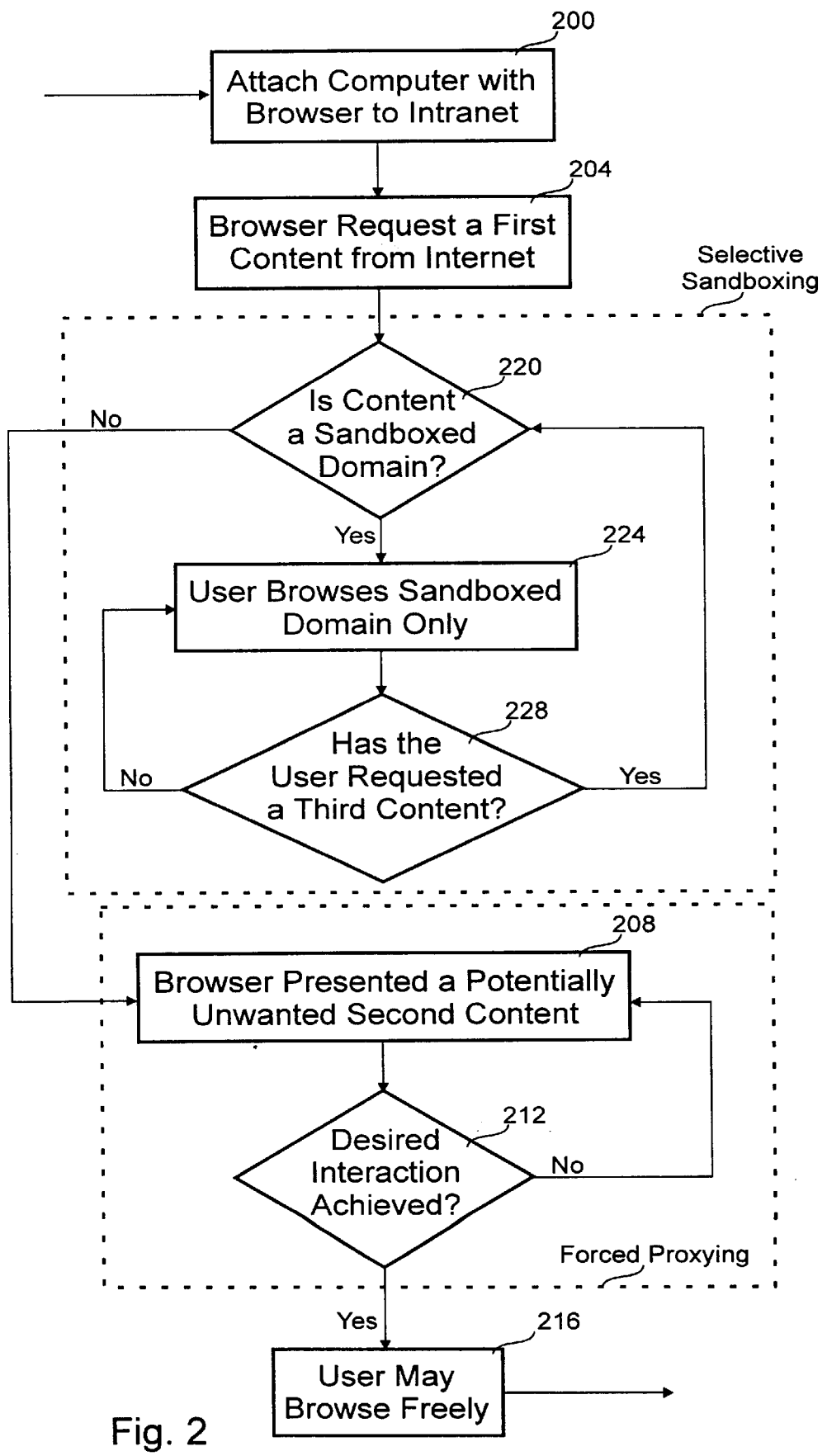
FIG. 2 is a flow diagram which schematically depicts the operation an embodiment of the control system.

With reference to FIG. 2, an embodiment of the control system 100 is schematically depicted as a flow chart. The user attaches the computer 120 to a port to the intranet 110 in step 200. Commonly, the port is a modem or network port, but could be any wired or wireless communication mechanism. The browser on the user machine 120 requests a first content from the Internet 140 in step 204. A determination is made by the proxy server 130 as to whether the first content is from a "sandboxed" domain in step 220. If the first content is from a sandboxed domain, the user in step 224 can freely browse that domain without being subject to forced proxying. When the user attempts to point the browser in order to receive a third content in step 228, a new determination is made as to whether the third content is from another sandboxed domain. In this way, the user may browse as many sandboxed domains as desired without being subject to forced proxying.

However, if the forced proxy server 130 notices a request for a non-sandboxed domain in step 220, the forced proxy process is begun. In proceeding to step 208, the first or third non-sandboxed content is substituted with a second content. The second content is typically provided from an advertiser on the intranet 110 or Internet 140. A desired interaction with the second content is required of the user before forced proxying may end in step 212. The desired interaction with the second content may simply be a passive time delay or positive requirement that certain steps be taken. Providers of the second content may embed the desired interaction in their web site such that desired interaction is reprogramable. Once the desired interaction is achieved in step 212, the user is allowed to browse the Internet 140 freely in step 216. As an added step, the browser could present the first content (i.e., the content requested before forced proxying began) automatically after the desired interaction is achieved in step 212.

While browsing the Internet with the user machine 120, both wanted and potentially unwanted content is presented to the user. For example, a particular web page may contain an article about stocks which is the desired content of the user. However, the web page would typically contain potentially unwanted or non-requested content in the form of advertising. In other words, the web page is mostly desired content and partially undesired content. Ratios of more than 80% desired content to less than 20% potentially undesired content are typical on web pages today. Commonly, advertising is in the form of banners or buttons which contain information related to the advertiser. If the user is interested in the advertised product or service, clicking on the banner or button will point the web browser to another site. Although the advertising is potentially unwanted, the user enjoys reading the free article about stocks.

The amicable exchange of mostly free desired content for a small amount of potentially undesired advertising is appreciated by users. As those skilled in the art can appreciate, the advertising, even though potentially unwanted, has become expected by users in the normal course of web browsing. However, the user is not accustomed to seeking a web page related to fly fishing, for example, with the associated advertising and instead receiving a web page related to the latest blockbuster movie with any associated advertising. Use of forced proxying in this way allows unexpected substitution of a majority of the desired content (i.e. fly fishing information) for potentially unwanted content (i.e., the latest blockbuster movie).

With respect to examples of control steps or algorithms, the software control program to which the web request is transferred for control purposes can include the following controls when it receives a web request for content.

The user machine 120 is caused to receive a returned HTTP (HyperText Transport Protocol) redirect message. This is a special command that directs the web browser of the user machine 120 to "jump to" or be provided with information from another web site location, without any display or other indication of this web site change to the particular user machine 120. For example, a user machine 120 receiving a request to its browser in the form of www.abc.com could be directed by the control program in the proxy server 130 to access www.xyz.com as the web site address or URL to be displayed or from which information is to be obtained.

Alternatively, the control program could return a web page to the user machine 120 based on a path that the user machine 120 selected. For example, if an input were received by the user machine 120 in the form of the web site address www.abc.com/index or www.def.com/index, the proxy server 130, by means of the software module that determines that this is a TCP packet and also by means of the software control program, could instead access and fetch one or more web pages from the web site address www.xyz.com/index. Similarly, an input to the particular user machine 120 in form of www.abc.com/xxx, could result in the proxy server 130 obtaining www.xyz.com/xxx. In this way, the particular user machine 120 will always be forced to receive return information from the www.xyz.com web site. Except for the "location" URL typically displayed on a status line in the web browser, the web brouser will read something different, because it is reading from www.xyz.com and not www.abc.com/xxx, it will appear to the user machine 120 that the desired URL (i.e., www.abc.com/xxx) is being accessed properly.

Alternatively, the proxy server 130 could return to the user machine 120 the actual web page that the user machine 120 requested. In this case, the control program acts like a normal proxy server by connecting to the Internet 140 and fetching the requested page or pages. This functionality can be identified as "sandboxing" by which requests to certain one or more locations on the web are allowed or granted without modification, while others are not. For instance, connections to www.xyz.com could be proxied in this manner, while other requests my generate a set of pages from a web site different from the requested web site.

Alternatively, the control program could return web page(s) based on particularly identified information about the user machine 120. The proxy server 130 may rely on the IP address that it receives to provide a response based thereon. Other information about the user machine 120 might also be utilized in customizing a response to a web request from that user machine 120.

With respect to describing in greater detail the methodology and operations of the present invention, two examples are provided:

EXAMPLE 1

Log in to a network different from that to which the user machine is normally configured, such as logging in at a hotel or other multi-unit property.

Figure 3:
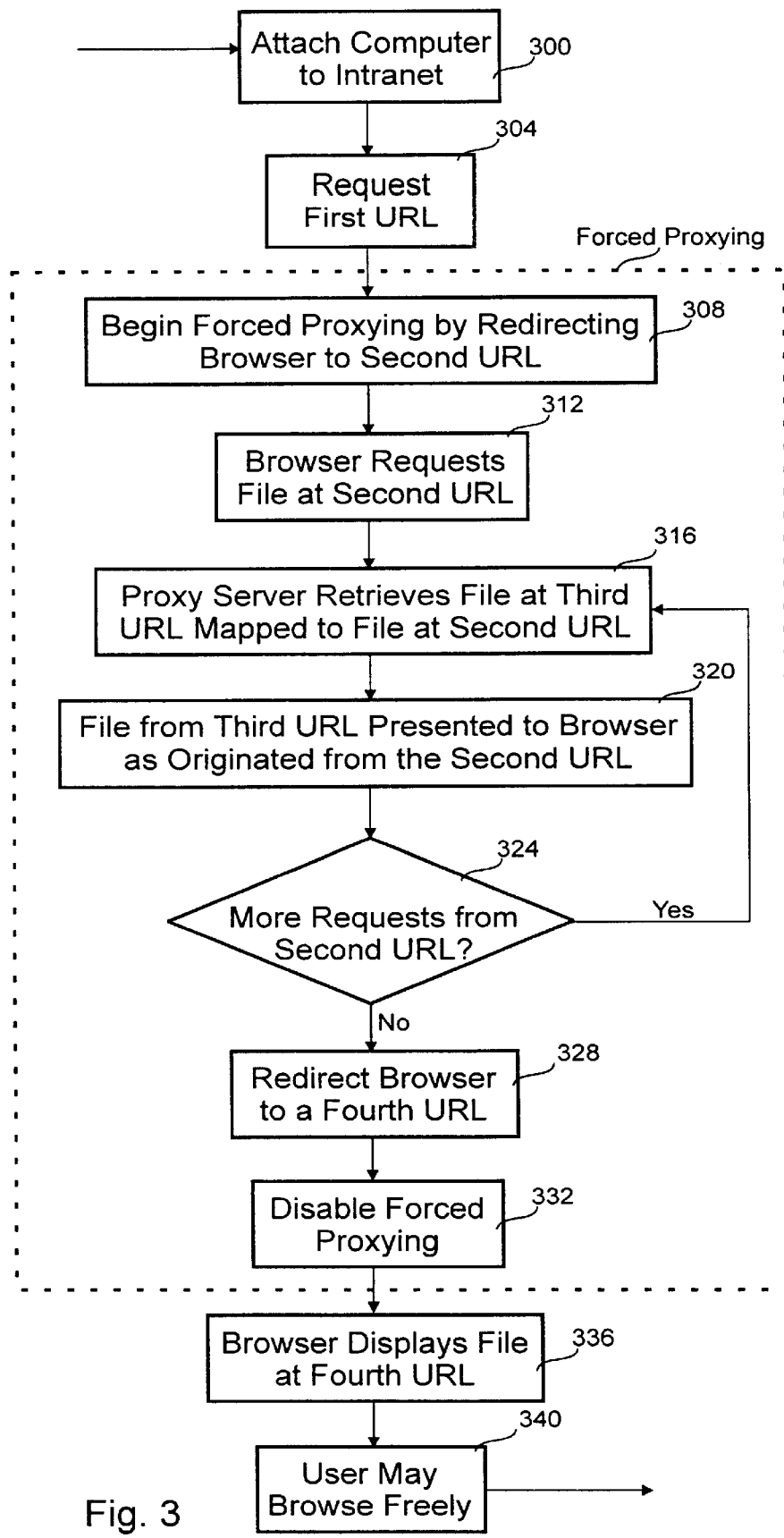
FIG. 3 is a flow diagram which schematically depicts the operation of an embodiment which may be used in a multi-unit property.

With reference to FIG. 3, a user plugs in a laptop and runs the browser in step 300. The user's default web page is a first URL home.browserid.com/Index.htm. The user's laptop (user machine 120) attempts to connect to port 80 of home.browserid.com in step 304. The server 130 redirects this request to the forced proxying or control program. The control program determines that this is the first time it has seen this user machine 120. The control program returns a HTTP redirect message sending the user machine 120 to a second URL at www.login.com in step 308. The user's laptop receives this message and now tries to fetch www.login.com by attempting to connect to port 80 of www.login.com in step 312. The server 130 redirects this request to the control program. The control program recognizes the second URL at www.login.com. When it receives requests to www.login.com it knows to respond with a set of pages stored at a third offsite server www.connectgroup.com. Next in step 316, the control program connects to that third server and fetches a third home page from that offsite server, namely, www.connectgroup.com. The third home page is returned to the user machine 120 in step 320. Because the third home page contains two images, image1.gif and image2.gif, the user machine browser makes two additional connections to port 80 on www.iogin.com in step 324, once for each image. In as similar manner as described above, the server 130 redirects these requests to the control program. The control program recognizes www.login.com again. It also sees that the user machine 120 is trying to access /image1.gif and /image2.gif, respectively, on that server. It connects to the offsite server and fetches www.connectgroup.com/image1.gif and www.connectgroup.com/image2.gif. It returns these images to the particular user machine 120. The user views this page and clicks on one of the links on the page, which directs the user to www.login.com/page2.html. The server 130 redirects this request to the control program. The control program recognizes www.login.com again. It also sees that the user machine 120 is trying to access /page2.html on that server. It connects to the offsite server and fetches www.connectgroup.com/page2.html. It returns this page to the particular user machine 120. The user sees on the monitor of the user machine 120 that this page contains a "login" button which upon activation ultimately results in the user being allowed to browse the Internet freely. The user selects or clicks it. This action or selection causes the user machine 120 to access www.login.com/login. The server 130 software module redirects this request to the server control program. The control or forced proxying program recognizes www.login.com and also the page being accessed as /login. The program realizes that this user machine 120 is trying to log in. In step 328, the program forwards the user machine 120 a fourth web page by using a redirect command. This page will cause the user machine 120 to jump to a fourth URL www.lodgenet.com in five seconds, which is enough time for the control program to disable forced proxying for this user in step 332. The control program disables forced proxying for this user machine IP address. The user machine 120 displays a "logging you in . . . " message for five seconds and then the www.lodgenet.com home page is displayed in step 336. The operator of this user machine 120 can then begin to use the Internet normally in step 340.

EXAMPLE 2

Internet service provider (ISP) advertising banner.

A user plugs in a modem of the user machine 120 and dials to the user's ISP. The user then launches the web browser for the particular user's machine 120. The user inputs www.stock-quote.com to access and check stocks. This user machine 120 attempts to connect to port 80 of www.stock-quote.com. The server 130 redirects this request to the control program. The control program responds with HTTP redirect command, which sends the user machine 120 to www.community.com, the ISP's community page. The user machine 120 receives this message and attempts to fetch www.community.com. It attempts to connect to port 80 of www.community.com. The server 130 redirects this request to the forced proxying program. The forced proxying program recognizes www.community.com as a sandboxed domain. It fetches www.community.com and returns this page to the user machine 120. This page includes a selector element or button which allows the user machine 120 to access the site it initially sought, in this case, www.stock-quote.com. The server 130 overlays the appropriate codes in the www.community.com web page to make this button work properly.

Loosing the user to non-sandboxed domains is avoided by the proxy server 130. A preexisting advertising banner on the www.community.com web page may want to lure the user to www.flycast.com. The proxy server 130 intercepts the browser's request for the advertising banner to determine if www.flycast.com is recognized as another sandboxed domain. If www.flycast.com is an approved sandboxed domain, the proxy server fetches the advertising banner for www.flycast.com. The user machine browser displays the advertising banner on the monitor screen. The user may view this advertisement, but wants to check stock quotes.

To proceed to the originally requested web site, the user clicks on the button on the www.community.com page which takes the user to www.stock-quote.com. The server 130 redirects this request to the control program. The control program remembers that www.stock-quote.com was the site that the user initially wanted to access. It returns to the user machine 120 a "logging you in . . . " page with a redirect which will point the user's browser to www.stock-quote.com in five seconds. The program then disables forced proxying for this user machine 120. In five seconds, the user machine browser fetches the web page stored at www.stock-quote.com. The user machine 120 can now use the Internet normally.

Figure 4:
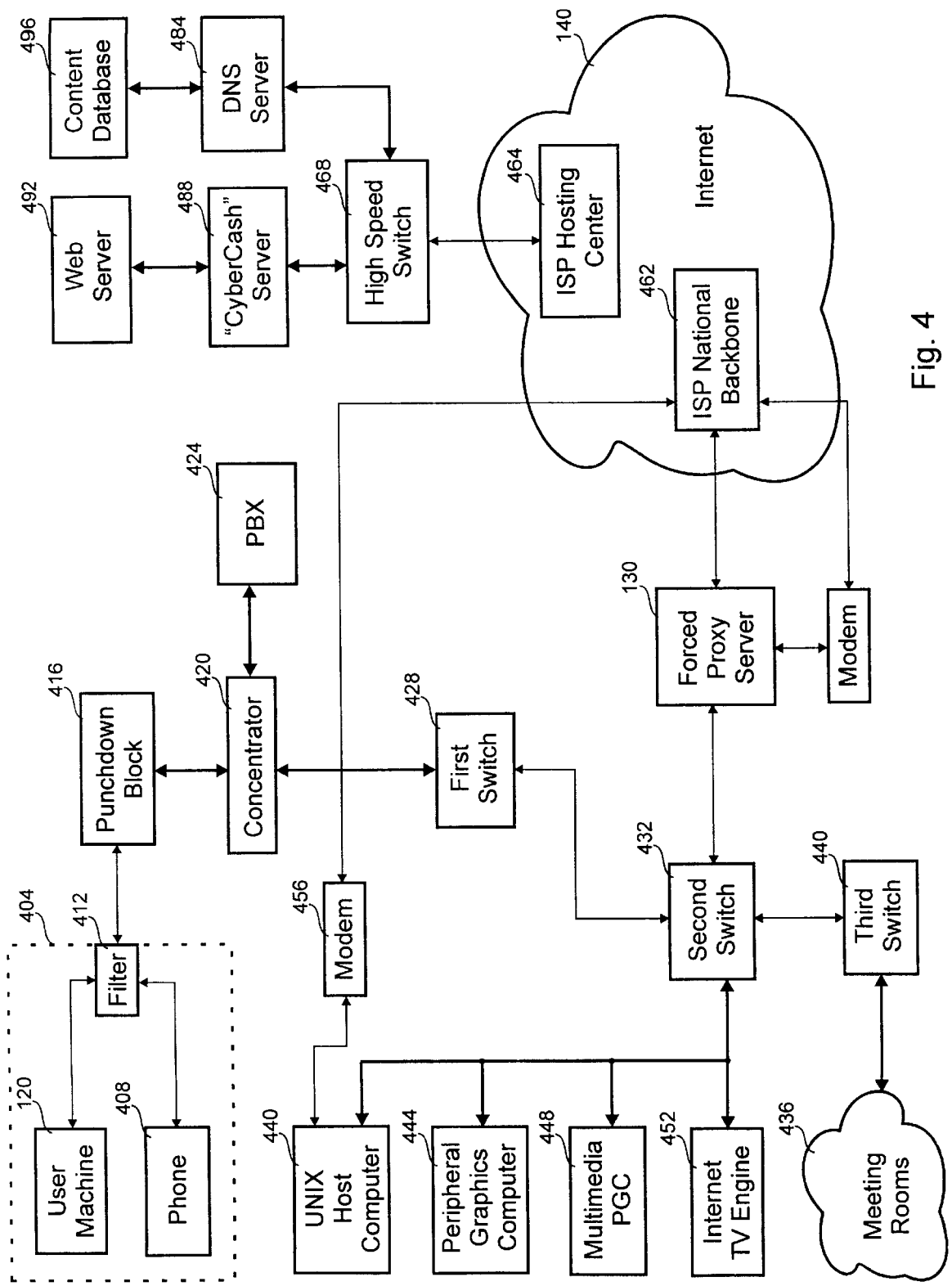
FIG. 4 is a block diagram which schematically depicts an embodiment deployed in a multi-unit property.

With reference to FIG. 4, an embodiment of the control system implemented for a multi-unit property (e.g., a hotel, an apartment or the like) is shown in block diagram form. Located in each unit 404 is a phone 408 and the user machine 120. In this embodiment the phone 408 and user machine 120 are coupled to a filter 412 which serves to multiplex and demultiplex a voice signal and a computer data signal to and from a single pair of telephone wires. The filter 412 supports an ethernet connector and an analog or digital phone service connector. By using the ubiquitous pair of telephone wires to convey both voice and data, expensive rewiring of the property is avoided. It is noted however, separate wires for voice and data signals could be utilized where feasible.

The combined voice and data wires running from each unit 404 are attached to a punchdown block 416. The punchdown block 416 allows interchangeable interconnection of the incoming telephone wires with the outgoing telephone wires. As those skilled in the art can appreciate, wiring and rewiring each unit 404 is made easier by using the punchdown block 416. The phone line from each unit 404 passes from the punchdown block 416 to a concentrator 420. The concentrator 420 takes the many phone lines from each unit and demultiplexes and multiplexes the voice and data signals. The voice signals are passed to the private branch exchange (PBX) 424 or to the phone company central office, while the data signals are passed to an intranet network.

The computer data signals from each user machine 120 pass from the concentrator 420 to a first ethernet switch 428 on the network. Within the first ethernet switch 428, the computer data signals from each unit 404 are merged into a fast network connection. For example, a 10 Mbit ethernet connection from each user machine 120 is merged into a single 100 Mbit ethernet connection. The faster network connection is coupled to a second ethernet switch 432 before being coupled to the forced proxy server 130. User machines 120 within meeting rooms can also connect to the second ethernet switch 432 by way of a third ethernet switch 440. In this way, user machines 120 in units 404 and meeting rooms 436 are able to communicate through the intranet 110 with the forced proxy server 130 and ultimately, with the Internet 140.

The intranet network provides for other premium services to the occupants of the units and their management staff. A UNIX host computer 440 controls operation of a number of premium services provided to each unit 404 or meeting room 436. The premium services include hotel and city information, home shopping, room service ordering, selection of pay per view movies, Internet browsing, video game playing, etc. The premium services are implemented with at least the following: a peripheral graphics computer ("PGC") 444, a multimedia peripheral graphics computer ("MMPGCs") 448, an Internet television ("INTV") engine 452, and a television in each unit. The host computer 440, in addition to controlling premium services, provides services to the management staff which allow for updating information in the premium services and attending to other administrative tasks. Information from remote locations may be needed for the host computer 440 to perform some of these services. To assure these services are available, a redundant connection is provided to the Internet 140 through a modem 456 or the like. The redundant connection provides a second way to connect the intranet 110 to the Internet 140. Bandwidth permitting, the Internet browsing initiated by the user machines 120 may also use the redundant connection.

The peripheral graphics computer ("PGC") 444 and multimedia peripheral graphics computer ("MMPGCs") 448 allow the occupants to interact with premium services supplied by the host computer 440. These computers formulate the menus and interactive screens required by the premium services. A keyboard, remote control or other input device allows interaction with content displayed on the television within the unit 404. For example, interactive home shopping, video directories, advertising and other information services may be provided by the PGC 444 and MMPGC 448 and user would use the remote control to relay selections to the PGC 444 and MMPGC 448.

Internet web browsing is supplied by the Internet television ("INTV") engine 452. The INTV engine 452 provides basic browsing of the Internet 140 using a television monitor for a display, while a keyboard, a remote control, or a mouse is used for input. Internet content is provided by either the primary or redundant Internet connection. Browsing with the Internet television can also be subjected to forced proxying in the aforementioned ways.

Included on the Internet is a media data center or hosting center 464 which interfaces a "cybercash" server 488, a web server 492 and a content database 496 with the intranet network by way of an ISP backbone 462. A high speed switch 468 serves as a hub to connect a DNS (Domain Name Server) server 484, the cybercash server 488, the web server 492 and the content database 496 to the hosting center 464. The DNS server 484 provides routing for the information requests from the Internet 140 so that a URL may be correlated with an IP address. The cybercash server 488 provides software which secures payment for any webbrowsing or premium services the occupant may utilize. Encryption of the cybercash transaction is implemented on a secure sockets layer session in the browser.

The web server 492 and content database 496 act in concert to provide the content for implementing forced proxying. When forced proxying begins, web pages are formulated by the web server 492 from information within the content database 496. For example, a page unique to the hotel and containing appropriate logos is displayed providing instructions for use of the Internet service. If additional payment is required for use of the Internet service, a form asking for credit card information could be presented. The credit card payment could be secured by the cybercash server 488 so that the information passes over the Internet securely. In this way, the web server 492 can formulate customized web pages for each property based upon information from the content database 496.

The forgoing description of the invention has been presented for the purposes of illustration and description and is not intended to limit the invention. Variations and modifications commensurate with the above description, together with the skill or knowledge of the relevant art, are within the scope of the present invention. The embodiments described herein are further intended to explain the best mode known for practicing the invention and to enable those skilled in the art to utilize the invention in such best mode or other embodiments, with the various modifications that may be required by the particular application or use of the invention. It is intended that the appended claims be construed to include alternative embodiments to the extent permitted by the prior art.

What is claimed is:

1. A method related to controlling communication of a message from a user machine to a global computer network including the Internet, comprising:

sending a message from a user machine to a proxy server disposed between said user machine and said global computer network, said message to said global computer network including at least a first data packet having a number of fields including a first field related to a first destination address;

receiving said message by said proxy server;

controlling said message by said proxy server including changing said first destination address to a source different from said first destination address, wherein said source provides at least one web page having web page information accessible over the Internet that is different from web page information accessible over the Internet using said first destination address; and providing returned information including said at least one web page to said user machine using said source.

2. A method, as claimed in claim 1, further comprising the steps of:

determining if said first destination address is part of a predetermined list of destination addresses;

selectively disabling said controlling step when said first destination address is included in said predetermined list such that said destination address remains unchanged, wherein the disabling step allows obtaining information by said user machine based on said first destination address.

3. A method, as claimed in claim 1, wherein:

said first destination address is an address associated with a web site, with said web site being accessible over the Internet and said source has a second destination address associated with the Internet.

4. A method, as claimed in claim 3, wherein:

said web page information obtained using said first destination address is directly accessible by said user machine, in the absence of said proxy server, using the Internet.

5. A method, as claimed in claim 1, wherein:
said controlling step includes transferring said message from a first port of said proxy server when said proxy server ascertains that said message is to be sent using said global computer network.

6. A method, as claimed in claim 5, wherein:
said changing step includes using a control program of said proxy server that is accessible from a second port of said proxy server, said proxy server control program having executable code used in determining an identity of said source.

7. A method, as claimed in claim 6, wherein:
said receiving step includes causing said proxy server control program to allow said user machine to directly access destination addresses of said global computer network and avoid changing to another address.

8. A method, as claimed in claim 1, wherein:
said controlling step includes transmitting destination information based on said source from a second port of said proxy server to a first port thereof.

9. A method, as claimed in claim 1, wherein:
said receiving step includes receiving said message at a first predetermined port of said proxy server.

10. A method, as claimed in claim 1, wherein:
said at least one web page from said source includes at least one of the following: logging in information and advertising information.

11. A method, as claimed in claim 1, wherein:
said receiving step includes making available an option using said at least one web page that enables said user machine to link to said first destination address.

12. A method, as claimed in claim 11, wherein:
said sending step includes inputting information to a web browser using said user machine related to said first destination address.

13. A system for controlling message transmissions between a user machine and a global computer network including the Internet, comprising:
a proxy server in communication with the user machine and the global computer network, said proxy server including a first port for receiving messages from the user machine; and
a communications network interconnecting the user machine and said proxy server;
wherein said proxy server receives at least a first message from the user machine, said first message including at least a first data packet having a number of fields including a first field related to a first destination address, with said first destination address being associated with a web site accessible over the Internet, said proxy server ascertaining whether said first message is to be directed to the Internet, said message being sent to a control program of said proxy server when said message is directed to the Internet, said proxy server control program determining whether said message is to be permitted to be sent to said first destination address, wherein said proxy server returns at least one web page having information accessible over the Internet, using said source, which is different from a web page having information available over the Internet using said first destination address.

14. A system, as claimed in claim 13, wherein:
said proxy server determines whether said message is to be permitted to be sent to said first destination address using a number of parameters including at least one of:
information received from the user machine,
an address associated with the user machine,
an identification of a user of the user machine,
a destination address of said message, and
whether the user machine or the user thereof has unregulated access to addresses on the global computer network.

15. A system, as claimed in claim 13, wherein:
said first packet has a second field related to identifying a TCP port.

16. A system, as claimed in claim 13, wherein:
said proxy server returns to the user machine a HTTP redirect message in which the user machine is directed to access said source on the global computer network.

17. A system, as claimed in claim 13, wherein:
said proxy server returns to the user machine information from said source having an identity determined using information related to the user machine.

18. A system, as claimed in claim 13, wherein:
said information returned by said proxy server to the user machine relates to information available using said first destination address.

19. A system, as claimed in claim 13, wherein:
said proxy server includes a second port in communication with said proxy server control program and to which at least portions of said first message are sent when said first message is directed to the global computer network.

20. A system, as claimed in claim 13, wherein:
substantially all of said at least one web page information returned by said proxy server is different from said web page information that is obtained using said first destination address.

21. A system, as cl aimed in claim 13, wherein:
at least a majority of said at least one web page information returned by said proxy server is different from said web page information that is obtained using said first destination address.

22. A method f or controlling communications between a user machine and a global computer network including the Internet, comprising:
inputting a first destination address using a web browser that is operating on a user machine, said first destination address being associated with at least a first web page having first information accessible using the Internet;
receiving said first destination address by a proxy server;
changing by said proxy server said first destination address to a second destination address associated with second information; and
providing said second information to said user machine before providing said first web page having said first information to said user machine.

23. A method, as claimed in claim 22, wherein:
said second information includes at least one of: logging in information and advertising information.

24. A method, as claimed in claim 22, wherein:
said second information is part of a second web page accessible using the Internet.

25. A method related to controlling communications between a user machine and a global computer network including the Internet, comprising:
providing a user machine that can operate with a browser involved with enabling communications by said user machine over the global computer network, said user machine being normally configured for a first intranet network;

connecting said user machine to a second intranet network different from said first intranet network;

inputting a first destination address using said browser after said connecting step, said first destination address being associated with a first web site having first information accessible using the Internet;

providing a second destination address associated with a second web site accessible using the Internet while said user machine is connected to said second intranet network, said second web site having second information different from said first information, said second information including at least one of: logging in information and advertising information, said providing step being conducted using a proxy server responsive to said user machine; and sending said second information to said user machine.

26. A method, as claimed in claim 25, wherein:

said sending step is conducted before any transmitting of said first information to said user machine.

27. A method, as claimed in claim 26, wherein:

said second intranet network includes at least one of the following: a computer network associated with a hotel and a computer network associated with an apartment building.

* * * * *

US006226677C1

(12) EX PARTE REEXAMINATION CERTIFICATE (5333rd)
United States Patent
Slemmer

(10) Number: US 6,226,677 C1
(45) Certificate Issued: Apr. 11, 2006

(54) CONTROLLED COMMUNICATIONS OVER A GLOBAL COMPUTER NETWORK

(75) Inventor: Michael W. Slemmer, Sioux Falls, SD (US)

(73) Assignee: Acacia Internet Access Corporation, Newport Beach, CA (US)

Reexamination Request:
No. 90/007,307, Nov. 17, 2004

Reexamination Certificate for:
Patent No.: 6,226,677
Issued: May 1, 2001
Appl. No.: 09/232,386
Filed: Jan. 15, 1999

Related U.S. Application Data

(60) Provisional application No. 60/109,878, filed on Nov. 25, 1998.

(51) Int. Cl.
*G06F 15/16* (2006.01)

(52) U.S. Cl. ...................................................... 709/227
(58) Field of Classification Search ........................ None
See application file for complete search history.

(56) References Cited

U.S. PATENT DOCUMENTS 5,987,611 A    11/1999   Freund ........................ 713/201

OTHER PUBLICATIONS

Luotonen et al, World–Wide Web Proxies, Apr. 1994.
J. Stewart, "Working with Proxy Servers" *WebServer Magazine*, Mar. 1997.
D. Wessels, Squid proxy server configuration file 1.93.2.2, "TAG: deny_info", Mar. 3, 1997, posted, among other URLs, at http://www.squid–cache.org/mail–archive/squid–users/199703/att–0250/squid.conf.
Cord Beerman, Squid archive posting at http://www.squid–cache.org/mail–archive/squid–users/199611/0385.html, Nov. 25, 1996.
RFC 791, Internet Protocol, Sep. 1981, available at http://www.faqs.org/rfcs/rfc791.html.

*Primary Examiner*—Bharat Barot

(57) ABSTRACT

In one embodiment, a method related to controlling communication of a TCP packet from a user machine is disclosed. During a browser request from the user machine, the TCP packet is sent via the intranet to a forced proxy server. The TCP packet having a number of fields including a first field related to a first destination IP address. The TCP packet and its first destination IP address is received by the forced proxy server and analyzed. If the first destination IP address is not from a "sandboxed" domain, the first destination IP address is changed to a predetermined second destination IP address to effectively reroute the TCP packet to another IP address on the Internet. The rerouted IP address provides content to the user machine in which at least a majority of the content is different from that expected to be obtained by the user machine.

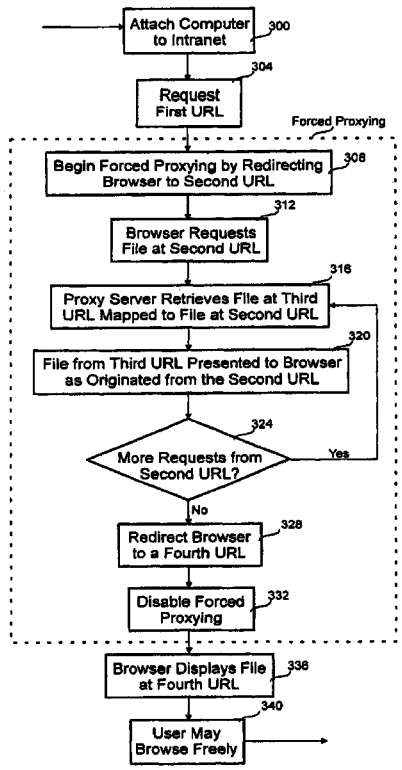

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–27 are cancelled.

* * * * *